US008566095B2

(12) United States Patent  
Davis

(10) Patent No.: US 8,566,095 B2  
(45) Date of Patent: *Oct. 22, 2013

(54) SEGMENTING WORDS USING SCALED PROBABILITIES

(75) Inventor: Mark Davis, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 105 days.

This patent is subject to a terminal disclaimer.

(21) Appl. No.: 13/270,934

(22) Filed: Oct. 11, 2011

(65) Prior Publication Data

US 2012/0089388 A1    Apr. 12, 2012

Related U.S. Application Data

(63) Continuation of application No. 12/104,014, filed on Apr. 16, 2008, now Pat. No. 8,046,222.

(51) Int. Cl.  
*G10L 15/14* (2006.01)

(52) U.S. Cl.  
USPC ............. 704/251; 704/255; 704/4; 704/9; 704/10

(58) Field of Classification Search  
USPC ................. 704/251, 255, 4, 9, 10  
See application file for complete search history.

(56) References Cited

U.S. PATENT DOCUMENTS

| | | | |
|---|---|---|---|
| 7,275,029 B1 | 9/2007 | Gao et al. | |
| 7,385,591 B2 * | 6/2008 | Goodman | 345/172 |
| 8,046,222 B2 | 10/2011 | Davis | |
| 2001/0009009 A1 * | 7/2001 | Iizuka | 707/539 |
| 2004/0059574 A1 | 3/2004 | Ma et al. | |
| 2004/0220809 A1 * | 11/2004 | Wang et al. | 704/257 |
| 2004/0243409 A1 | 12/2004 | Nakagawa | |
| 2005/0015239 A1 | 1/2005 | Bellegarda | |
| 2005/0154578 A1 | 7/2005 | Tong et al. | |
| 2005/0209844 A1 | 9/2005 | Wu et al. | |
| 2006/0009965 A1 | 1/2006 | Gao et al. | |
| 2006/0015317 A1 | 1/2006 | Nakagawa | |
| 2010/0211378 A1 | 8/2010 | Bulyko | |

OTHER PUBLICATIONS

Davis, M., "Unicode Standard Annex #29: Text Boundaries", 2006, Unicode [online], [retrieved on Dec. 28, 2010]. Retrieved from the Internet: <http://www.unicode.org/reports/tr29/>, 30 pages.  
Dean, J., et al., "MapReduce: Simplified Data Processing on Large Clusters", Proceedings of the 6th Symposium on Operating Systems Design and Implementation, Dec. 6, 2004, pp. 137-150.  
International Preliminary Report on Patentability for PCT Application No. PCT/US2009/040110, mailed Oct. 28, 2010, 7 pages.  
Notification of Transmittal of the International Search Report and the Written Opinion of the International Searching Authority, or the Declaration for Application No. PCT/US2009/040110, dated Nov. 30, 2009, 12 pages.  
CN Office Action mailed Aug. 31, 2012 (English translation only) from Chinese Application No. 200980121627, 5 pgs.

* cited by examiner

*Primary Examiner* — Qi Han  
(74) *Attorney, Agent, or Firm* — Fish & Richardson P.C.

(57) ABSTRACT

Systems, methods, and apparatuses including computer program products for segmenting words using scaled probabilities. In one implementation, a method is provided. The method includes receiving a probability of a n-gram identifying a word, determining a number of atomic units in the corresponding n-gram, identifying a scaling weight depending on the number of atomic units in the n-gram, and applying the scaling weight to the probability of the n-gram identifying a word to determine a scaled probability of the n-gram identifying a word.

27 Claims, 5 Drawing Sheets

SEGMENTING WORDS USING SCALED PROBABILITIES

CROSS REFERENCE TO RELATED APPLICATION

This application is a continuation application of, and claims priority to, U.S. patent application Ser. No. 12/104,014, filed on Apr. 16, 2008, now U.S. Pat. No. 8,046,222 entitled "Segmenting Words Using Scaled Probabilities". The disclosure of the foregoing application is incorporated herein by reference in its entirety.

BACKGROUND

This specification relates to segmenting words using scaled probabilities.

A n-gram is a sequence of n consecutive tokens, e.g. words or characters. A n-gram has an order, which is the number of tokens in the n-gram. For example, a 1-gram (or unigram) includes one token; a 2-gram (or bi-gram) includes two tokens.

Each n-gram has an associated probability estimate that is calculated as a function of n-gram relative frequency in training data. For example, a string of L tokens is represented as $C_1^L = (c_1, c_2, \ldots, c_L)$. A probability can be assigned to the string $C_1^L$ as:

$$P(c_1^L) = \prod_{i=1}^{L} P(c_i | c_1^{i-1}) \approx \prod_{i=1}^{L} \hat{P}(c_i | c_{i-n+1}^{i-1}),$$

where the approximation is based on a Markov assumption that only the most recent (n−1) tokens are relevant when predicting a next token in the string, and the "^" notation for P indicates that it is an approximation of the probability function.

Traditional techniques of word segmentation assume that the probabilities of n-grams identifying words are independent. Therefore, the traditional techniques use a product of probabilities of lesser order n-grams to determine a probability of the n-gram identifying a particular word. Lesser order n-grams are derived from the n-gram. For example, suppose a n-gram is "abc". Then, lesser order n-grams of the n-gram "abc" include: "a", "b", "c", "ab", and "bc". The probability of the n-gram (e.g., "abc") identifying more than one word is the product of the individual probabilities of each lesser order n-gram identifying a word (e.g., "a", "b", and "c"; "a" and "bc"; or "ab" and "c").

Because the traditional techniques follow the principle of independent probabilities, the traditional techniques strongly favor segmenting n-grams into words including a greater number of atomic units than words including a lesser number of atomic units. An atomic unit is a smallest ideographic unit that can be derived from a n-gram (e.g., English characters for the English language). For example, suppose a n-gram is "abc". Further assume that "a", "b", "c", and "abc" each have a probability of identifying a word equal to 0.1, or:

$$P(\text{``}a\text{''}) = P(\text{``}b\text{''}) = P(\text{``}c\text{''}) = P(\text{``}abc\text{''}) = 0.1.$$

Although the probabilities of "a", "b", and "c" each identifying a word; and the probability of "abc" identifying a word are equally likely, the traditional techniques strongly favor segmenting the n-gram into the longer word "abc". Using traditional techniques, the probability of "abc" identifying three separate words (i.e., "a", "b", and "c") equals the probability of "a" identifying a word multiplied by the probability of "b" identifying a word multiplied by the probability of "c" identifying a word, or:

$$P(\text{``}a\text{''}, \text{``}b\text{''}, \text{``}c\text{''}) = P(\text{``}a\text{''})P(\text{``}b\text{''})P(\text{``}c\text{''}) = 0.001$$

Therefore, the probability that "abc" identifies a single word is far greater than the probability that "abc" identifies the three words "a", "b", and "c", or:

$$P(\text{``}abc\text{''}) > P(\text{``}a\text{''}, \text{``}b\text{''}, \text{``}c\text{''}).$$

As a result, the traditional techniques are biased toward segmenting the n-gram into "abc" since it has a higher probability of identifying a word.

In practice, probabilities of n-grams identifying words are much lower, increasing the problem of the traditional techniques favoring segmentations that include longer words over segmentations that include shorter words even though, in particular situations, segmentations that include shorter words can be more accurate.

SUMMARY

Systems, methods, and apparatus including computer program products for segmenting words using scaled probabilities. In general, one aspect of the subject matter described in this specification can be embodied in methods that include the actions of receiving a probability of a n-gram identifying a word, determining a number of atomic units in the corresponding n-gram, identifying a scaling weight depending on the number of atomic units in the n-gram, and applying the scaling weight to the probability of the n-gram identifying a word to determine a scaled probability of the n-gram identifying a word. Other embodiments of this aspect include corresponding systems, apparatus, and computer program products.

These and other embodiments can optionally include one or more of the following features. The scaled probability of the n-gram identifying a word can depend on the number of atomic units in the n-gram. The scaled probability of the n-gram identifying a word can be $x^n$, where x is the probability of the n-gram identifying a word and n is the number of atomic units in the n-gram. The scaled probability of the n-gram identifying a word can be $x^{1+k(n-1)}$, where x is the probability of the n-gram identifying a word, n is the number of atomic units in the n-gram, and k is a constant and $0 \leq k \leq 1$.

The method can further include receiving a plurality of tokens, and segmenting the plurality of tokens into words using the scaled probability. The method can further include identifying lesser order n-grams, the lesser order n-grams being derived from the n-gram, receiving probabilities corresponding to each of the lesser order n-grams identifying words, comparing the probability of the n-gram identifying a word to the probabilities of combinations of the lesser order n-grams identifying words, and when a probability of a combination of lesser order n-grams identifying a word differs from the probability of the n-gram identifying a word by a specified threshold amount, modifying the scaling weight corresponding to the probability of the n-gram identifying a word. The method can further include receiving a scaled probability of a n-gram identifying a word, determining scaled probabilities of lesser order n-grams identifying words, the lesser order n-grams being derived from the n-gram, and removing the n-gram from a dictionary when a scaled probability of a combination of lesser order n-grams identifying a word differs from the scaled probability of the n-gram identifying a word by a specified threshold amount.

Particular embodiments of the subject matter described in this specification can be implemented to realize one or more of the following advantages. Segmenting words using scaled probabilities prevents problems resulting from inaccurately favoring longer words over shorter words during segmentation. Using scaling probabilities in logarithmic space to determine segmentations avoids an arbitrary application of scaling weights, which results in segmentations that do not inaccurately favor segmentations of longer words over segmentations of shorter words. The scaling weights can be pre-computed in logarithmic space, thereby improving the accuracy of segmentations without impairing runtime performance. Refined scaled probabilities can be used in segmenting, which allows n-grams to be removed from a dictionary, thereby reducing the memory size of the dictionary. Refined scaling weights can account for probabilities that are not truly independent, resulting in improved accuracy in word segmentations.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In order to prevent word segmentations that inaccurately favor longer words over shorter words, scaled probabilities can be used to segment n-grams into words. Scaled probabilities are determined by applying scaling weights, as will be described in further detail below with reference to FIG. 2, to probabilities of n-grams identifying words.

In some implementations, the probabilities of n-grams identifying words can be trained using the relative frequency of the n-grams in training data (e.g., a corpus of web pages, search query logs, emails, and blogs). Additionally, in some implementations, a distributed training environment is used for large training data (e.g., terabytes of data). One example technique for distributed training is MapReduce. Additional details of MapReduce are described in J. Dean and S. Ghemawat, *MapReduce: Simplified Data Processing on Large Clusters*, Proceedings of the 6th Symposium on Operating Systems Design and Implementation, pp. 137 150 (Dec. 6, 2004).

Figure 1:
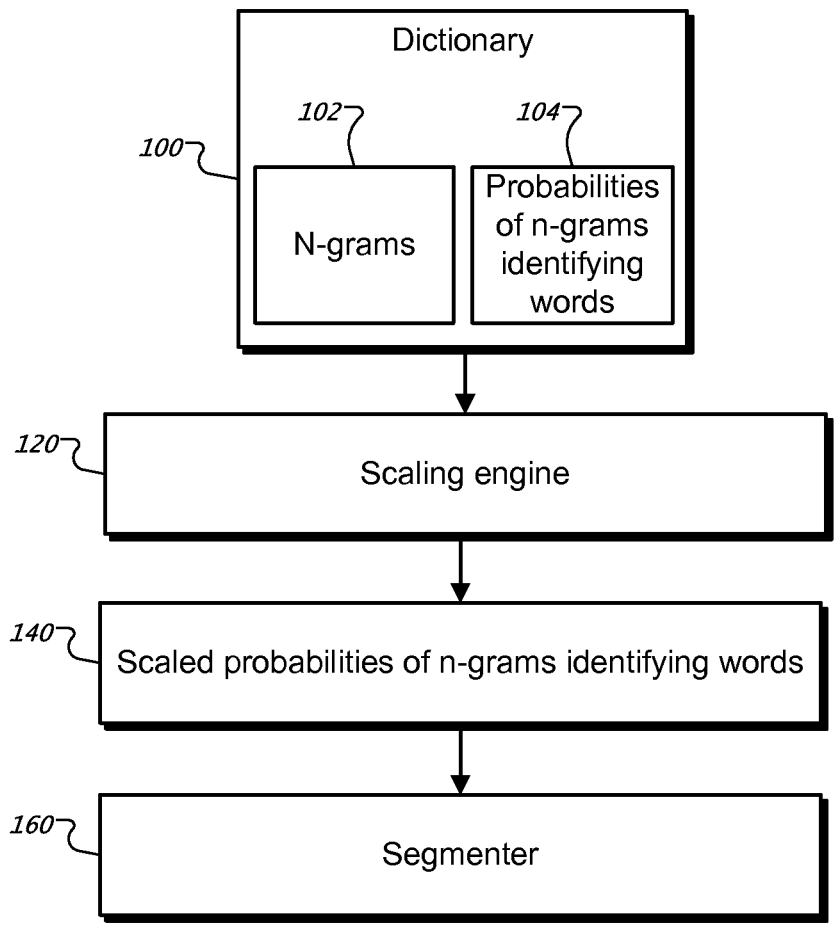
FIG. 1 is a block diagram illustrating an example segmentation system for segmenting words using scaled probabilities.

FIG. 1 is a block diagram illustrating an example segmentation system for segmenting words using scaled probabilities. In some implementations, the system includes a dictionary 100. The dictionary 100 includes a collection of n-grams 102 and corresponding probabilities of the n-grams identifying words 104. Thus, for each n-gram in the dictionary, there is a corresponding probability that the n-gram identifies a particular word. The probabilities can be determined, for example, based on the relative frequency of the n-grams in the training data. Alternatively, the probabilities and n-grams of the dictionary can be received by the system as input from an external source (e.g., a language model).

Scaling weights are applied to the probabilities of the n-grams identifying words to determine scaled probabilities of n-grams identifying words 140. In some implementations, a scaling engine 120 uses the dictionary 100 to determine scaled probabilities of n-grams identifying words 140. In particular, scaling engine 120 can apply scaling weights to the probabilities of n-grams identifying words 104 from the dictionary 100 to determine scaled probabilities of n-grams identifying words 140. Determining scaled probabilities is described below with respect to FIG. 3.

In some implementations, a segmenter 160 uses the scaled probabilities of n-grams identifying words 140 to segment a plurality of tokens (e.g., a sequence of Chinese characters) into words (e.g., Chinese words). For example, word segmenters and search engines can use segmenter 160 to segment sequences of tokens in one or more languages e.g., Chinese, Japanese, Korean, and Thai.

Figure 2:
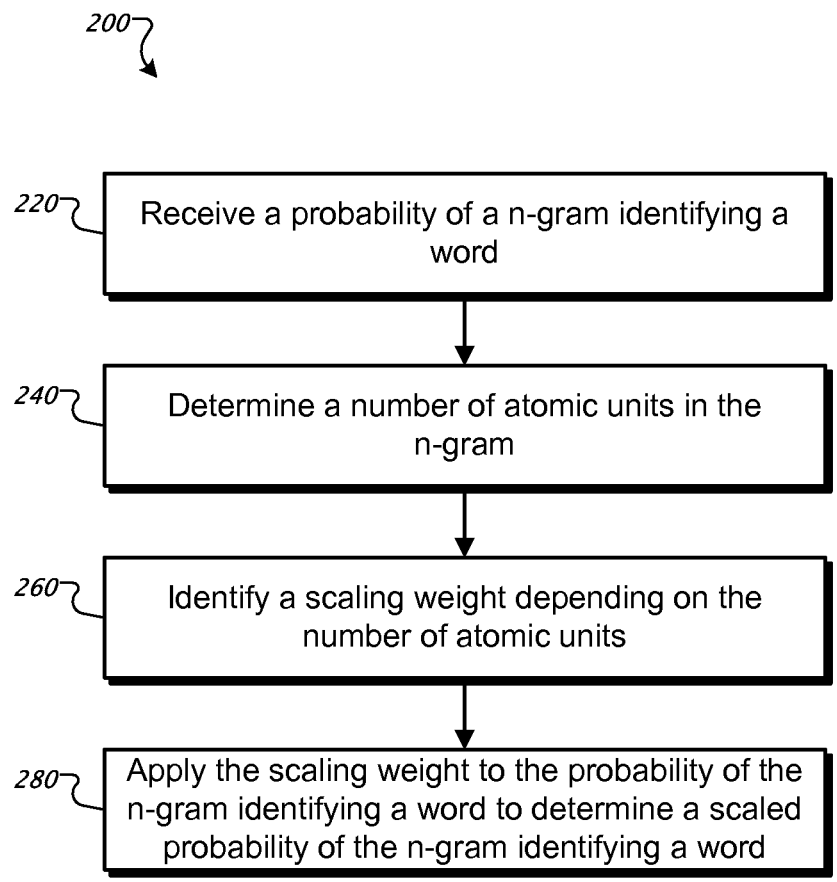
FIG. 2 is a flow chart showing an example process for generating a scaled probability of a n-gram identifying a word.

FIG. 2 is a flow chart showing an example process 200 for generating a scaled probability of a n-gram identifying a word. For convenience, generation of scaled probabilities of n-grams identifying words will be described with respect to a system that performs the generation.

The system receives 220 a probability of a n-gram identifying a word. The system determines 240 a number of atomic units in the n-gram that corresponds to the received probability. For example, the system receives a probability of a n-gram identifying a word, where the corresponding n-gram includes a sequence of three Chinese characters "x y z". The number of atomic units in "x y z" is three. As another example, the system receives a probability of a n-gram identifying a word, where the corresponding n-gram includes a sequence of English characters "basketball". The number of atomic units in "basketball" is ten.

In some implementations, atomic units correspond to grapheme clusters. A grapheme cluster is a user-perceived character. For example, one or more Unicode characters can be combined to make what a user considers to be a character or basic unit of a language. The letter "C" with an acute accent " ", or "Ć", is a grapheme cluster. A user may perceive "Ć" as a single character, but "Ć" can be represented by two Unicode code points (e.g., distinct code points representing "C" and " ", respectively). Additional details of grapheme clusters are described in, for example, M. Davis, *Unicode Standard Annex #29: Text Boundaries*, (2006), http://www.unicode.org/reports/tr29/.

The system identifies 260 a scaling weight depending on the number of atomic units. In some implementations, the scaling weight is the number of atomic units. The system applies 280 the scaling weight to the probability of the n-gram identifying a word to determine a scaled probability of the n-gram identifying a word. The scaling weight can be determined depending on the accuracy of segmentations in training. For example, once scaling weights are identified, the training data can be segmented using the scaled probabilities, and the scaling weights can be modified if the corresponding scaled probabilities are too low for particular words.

For example, a scaled probability of a n-gram identifying a word is equal to a probability of the n-gram identifying a word raised to the n power, where n is the number of atomic units in the n-gram, or:

scaledProbability(word)=[Probability(word)]$^n$.

Rewritten using logarithmic terms, the scaled probability can be expressed as:

scaledLogProbability(word)=logProbability(word)*$n$

In another example, the scaling weight is a value between one and n, where n is the number of atomic units in the n-gram. For example, a scaled probability of a n-gram identifying a word is equal to a probability of the n-gram identifying a word raised to the [1+k(n−1)] power, where n is the number of atomic units in the n-gram and k is a constant between zero (no scaling by the number of atomic units) and one (full scaling by the number of atomic units), or:

scaledProbability(word)=[Probability(word)]$^{[1+k(n-1)]}$.

Rewritten using logarithmic terms, the scaled probability can be expressed as:

scaledLogProbability(word)=logProbability(word)*[1+k(n−1)]

In some implementations, scaling weights are pre-computed. Furthermore, in some implementations, the scaled probabilities are determined in logarithmic space. Using a log scale simplifies computations for very small probabilities.

For example, a n-gram is "xyz". Assume "x", "y", "z", "xy", "yz", and "xyz" each have a probability of identifying a word equal to 0.1. A table below illustrates the probabilities of "x", "y", "z", "xy", "yz", and "xyz" identifying words. The table also illustrates scaled probabilities (e.g., scaledProbability(word)=[Probability(word)]$^n$) of "x", "y", "z", "xy", "yz", and "xyz" identifying words. In particular, the scaled probability of "xy" equals the probability of "xy" raised to the second power because "xy" has two atomic units, or:

scaledProbability("xy")=[Probability("xy")]$^2$=[0.1]$^2$=0.01.

Similarly, the scaled probability of "xyz" equals the probability of "xyz" raised to the third power because "xyz" has three atomic units, or:

scaledProbability("xyz")=[Probability("xyz")]$^3$=[0.1]$^3$=0.001.

|      | Probability (word) | scaledProbability (word) |
| ---- | ------------------ | ------------------------ |
| x    | 0.1                | 0.1                      |
| y    | 0.1                | 0.1                      |
| z    | 0.1                | 0.1                      |
| xy   | 0.1                | 0.01                     |
| yz   | 0.1                | 0.01                     |
| xyz  | 0.1                | 0.001                    |
| x yz | 0.01               | 0.001                    |
| x y z| 0.001              | 0.001                    |
| xy z | 0.01               | 0.001                    |

The probabilities of segmentations of a n-gram do not equal the probabilities of the n-gram (e.g., Probability("xyz")=0.1≠Probability("x", "y", "z")=0.001; Probability("xyz")=0.1≠Probability("x", "yz")=0.01; and Probability("xyz")=0.1≠Probability("xy", "z")=0.01). On the other hand, the scaled probabilities of segmentations of a n-gram equal the scaled probabilities of the n-gram (e.g., scaledProbability("xyz")=0.001=scaledProbability("x", "y", "z")=0.001; scaledProbability("xyz")=0.001=scaledProbability ("x", "yz")=0.001; and scaledProbability("xyz")=0.001=scaledProbability("xy", "z")=0.001).

Therefore, the scaled probabilities do not favor segmentations of longer words over shorter words. For example, using the scaled probabilities, a segmenter (e.g. segmenter 160) is equally likely to segment the n-gram "xyz" as "xyz", "x y z", "x yz" or "xy z". On the other hand, using the un-scaled probabilities, the segmenter favors segmenting the n-gram "xyz" as "xyz" because the probability of "xyz" is greater than the probabilities of "x y z", "x yz", and "xy z", though in reality the probabilities may vary.

Probabilities of individual tokens in a n-gram identifying separate words that occur together (i.e., not being part of a single word) may not be truly independent. Therefore, the scaling weights can be further refined to account for the dependent nature of the probabilities.

Figure 3:
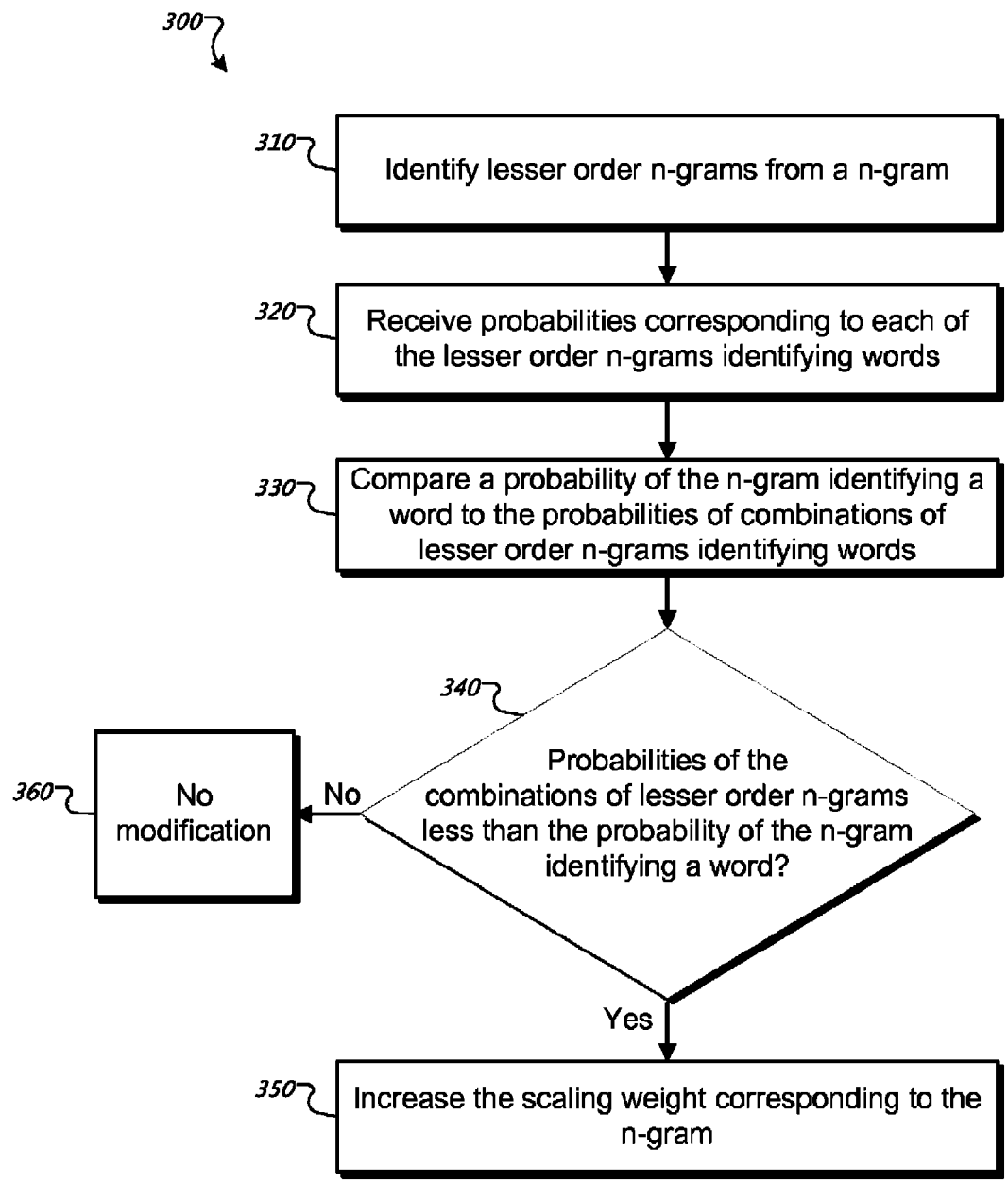
FIG. 3 is a flow chart showing an example process for modifying a scaling weight corresponding to a n-gram.

FIG. 3 is a flow chart showing an example process 300 for modifying a scaling weight corresponding to a n-gram. For convenience, modification of a scaling weight corresponding to a n-gram will be described with respect to a system that performs the process 300. The scaling weight can be modified if a probability of a combination of lesser order n-grams identifying a word differs from a probability of a n-gram identifying a word by a specified threshold amount.

The system identifies 310 lesser order n-grams by deriving the lesser order n-grams from a n-gram. The system receives 320 probabilities corresponding to each of the lesser order n-grams identifying words. The system then compares 330 the probability of the n-gram identifying a word to the probabilities of combinations of the lesser order n-grams identifying words. Combinations of lesser order n-grams are derived from the n-gram. For example, if an n-gram is "abc", the combinations of lesser order n-grams are ("a b c"); ("ab c"); and ("a bc"). If a probability of a combination of lesser order n-grams identifying a word is less than the probability of the n-gram identifying a word by a specified threshold amount ("Yes" branch of step 340), then the system increases 350 the scaling weight corresponding to the probability of the n-gram identifying a word. Otherwise ("No" branch of step 340), the process does not modify 360 the scaling weight corresponding to the probability of the n-gram identifying a word. For example, if a particular sequence of tokens "there of" is very unlikely, then the probability of "thereof" should be modified. In particular, the scaling weight corresponding to the probability of "thereof" identifying a word can be increased if the probability of "there of" is less than the probability of "thereof" by a specified threshold amount.

In some implementations, the system decreases the scaling weight corresponding to the probability of the n-gram identifying a word. If the probability of a combination of lesser order n-grams identifying a word is greater than the probability of the n-gram identifying a word by a specified threshold amount, the system decreases the scaling weight corresponding to the probability of the n-gram identifying a word. For example, if a particular sequence "can not" is very likely, then the probability of "cannot" should be modified. In particular, the scaling weight corresponding to the probability of "cannot" identifying a word can be decreased if the probability of "can not" is greater than the probability of "cannot" by a specified threshold amount.

In some implementations, n-grams are removed from the dictionary under particular circumstances. The dictionary (e.g., dictionary 100) includes a collection of n-grams and corresponding probabilities of the n-grams identifying words. For example, if a n-gram in a dictionary can be segmented using two or more lesser order n-grams (derived from the n-gram) in the dictionary, and a product of the scaled probabilities of the lesser order n-grams differs from a scaled probability of the n-gram by a specified threshold amount, then the n-gram is removed from the dictionary. In some implementations, if the product of the scaled probabilities of the lesser order n-grams is greater than the scaled probability of the n-gram, then the n-gram is removed from the dictionary. In the example, a segmenter (e.g., segmenter 160) would not segment the n-gram as identifying a word since the probability of the particular n-gram is less than the probability of the alternative segmentation using lesser order n-grams. Removing n-grams that would not be segmented as identifying words provides a more compact dictionary.

Figure 4:
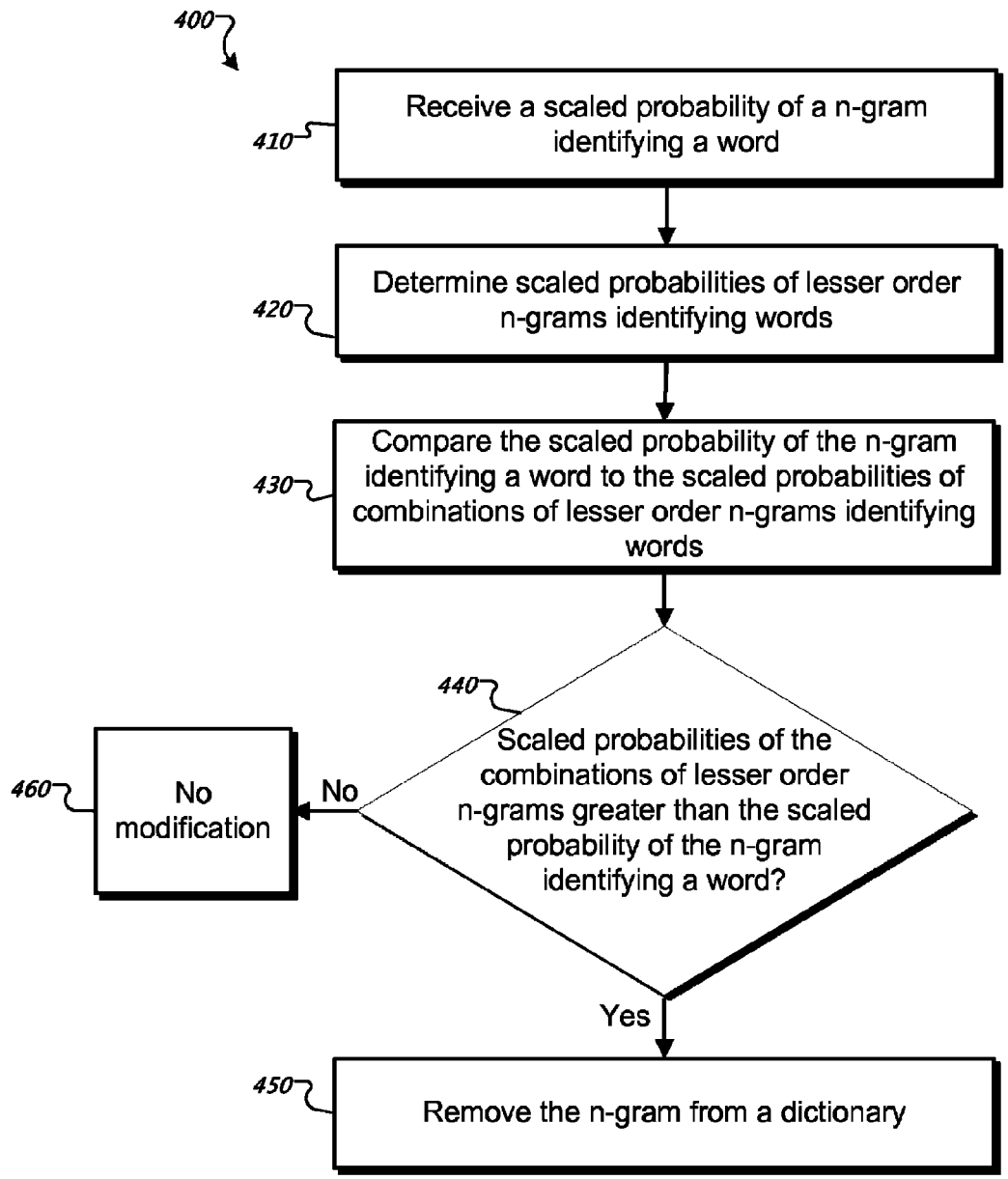
FIG. 4 is a flow chart showing an example process for removing a n-gram from a dictionary depending on scaled probabilities of lesser order n-grams derived from the n-gram.

FIG. 4 is a flow chart showing an example process 400 for removing a n-gram from a dictionary depending on scaled probabilities of lesser order n-grams derived from the n-gram. For convenience, removal of a n-gram from a dictionary depending on scaled probabilities of lesser order n-grams derived from the n-gram will be described with respect to a system that performs the process 400.

The system receives 410 a scaled probability of a n-gram identifying a word. The system determines 420 scaled probabilities of lesser order n-grams identifying words, where the lesser order n-grams are derived from the n-gram. The system compares 430 the scaled probability of the n-gram identifying a word to the scaled probabilities of combinations of the lesser order n-grams identifying words. If a scaled probability of a lesser order n-gram identifying a word is greater than the scaled probability of the n-gram identifying a word ("Yes" branch of step 440), then the system removes 450 the n-gram from a dictionary (e.g., a dictionary that includes scaled probabilities). Otherwise ("No" branch of step 440), the process does not modify 460 the dictionary, e.g., does not remove the n-gram from the dictionary.

Figure 5:
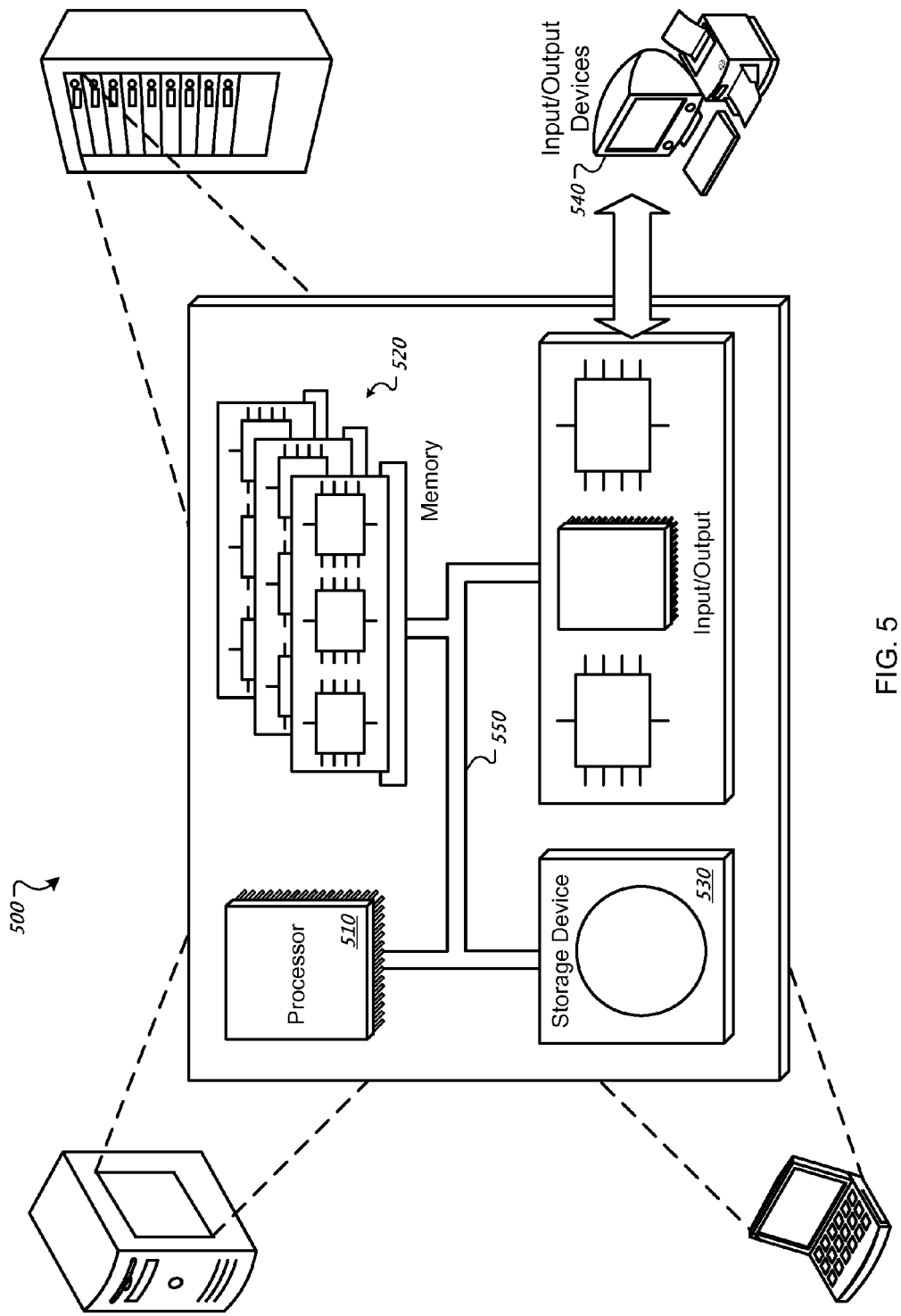
FIG. 5 is a schematic diagram of a generic computer system.

FIG. 5 is a schematic diagram of a generic computer system 500. The system 500 can be used for practicing operations described in association with the techniques described previously (e.g., processes 200, 300, and 400). The system 500 can include a processor 510, a memory 520, a storage device 530, and input/output devices 540. Each of the components 510, 520, 530, and 540 are interconnected using a system bus 550. The processor 510 is capable of processing instructions for execution within the system 500. Such executed instructions can implement one or more components of the segmentation system of FIG. 1, for example. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 is a computer readable medium such as volatile or non volatile that stores information within the system 500. The memory 520 could store the dictionary 100, for example. The storage device 530 is capable of providing persistent storage for the system 500. The storage device 530 may be a floppy disk device, a hard disk device, an optical disk device, or a tape device, or other suitable persistent storage means. The input/output device 540 provides input/output operations for the system 500. In one implementation, the input/output device 540 includes a keyboard and/or pointing device. In another implementation, the input/output device 540 includes a display unit for displaying graphical user interfaces.

The input/output device 540 can provide input/output operations for the segmentation system of FIG. 1. The segmentation system can include computer software components to determine scaled probabilities of n-grams identifying words and segment words using the scaled probabilities. Examples of such software components include the scaling engine 120 and the segmenter 160. Such software components 120 and 160 can be persisted in storage device 530, memory 520 or can be obtained over a network connection, to name a few examples.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine-generated electrical, optical, or electromagnetic signal, that is generated to encode information for transmission to suitable receiver apparatus for execution by a computer. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving a plurality of tokens, the plurality of tokens comprising a first n-gram, and the first n-gram being composed of a first number of atomic units; and
   segmenting, by one or more computers, the plurality of tokens into one or more words based at least in part on a scaled probability of the first n-gram identifying a word, the scaled probability being determined by adjusting an initial probability of the n-gram identifying a word based at least in part on the first number of atomic units.

2. The method of claim 1, wherein the first number of atomic units is n.

3. The method of claim 1, wherein adjusting the initial probability of the first n-gram identifying a word based at least in part on the first number of atomic units comprises:
   identifying a scaling weight depending on the first number of atomic units; and
   applying the scaling weight to the initial probability of the first n-gram identifying a word to determine the scaled probability of the first n-gram identifying a word.

4. The method of claim 3, wherein the scaled probability of the first n-gram identifying a word is $x^n$, where x is the initial probability of the first n-gram identifying a word and n is the first number of atomic units.

5. The method of claim 3, wherein the scaled probability of the first n-gram identifying a word is $x^{1+k(n-1)}$, where x is the initial probability of the first n-gram identifying a word, n is the first number of atomic units, k is a constant, and $0 \leq k \leq 1$.

6. The method of claim 3, further comprising:
   identifying lesser order n-grams, the lesser order n-grams being derived from the first n-gram;
   receiving initial probabilities corresponding to each of the lesser order n-grams identifying words;
   comparing the initial probability of the first n-gram identifying a word to initial probabilities of combinations of the lesser order n-grams identifying words; and
   when an initial probability of a combination of lesser order n-grams identifying a word differs from the initial probability of the first n-gram identifying a word by a specified threshold amount, modifying the scaling weight that depends on the first number of atomic units.

7. The method of claim 1, further comprising:
identifying lesser order n-grams, the lesser order n-grams being derived from the first n-gram; and
identifying a respective scaled probability of each of the lesser order n-grams identifying a word, the scaled probability for a particular lesser order n-gram composed of a particular number of atomic units identifying a word being determined by adjusting an initial probability of the lesser order n-gram identifying a word based at least in part on the particular number of atomic units.

8. The method of claim 7, wherein segmenting the plurality of tokens into one or more words comprises:
when a product of the respective scaled probabilities of the lesser order n-grams derived from the first n-gram identifying a word exceeds the scaled probability of the first n-gram identifying a word, segmenting the first n-gram such that each of the lesser order n-grams identifies a respective word.

9. The method of claim 7, wherein segmenting the plurality of tokens into one or more words comprises:
when the scaled probability of the first n-gram identifying a word exceeds a product of the respective scaled probabilities of the lesser order n-grams derived from the first n-gram identifying a word, segmenting the first n-gram such that the first n-gram identifies a word.

10. A system comprising:
one or more computers, and
one or more storage devices storing instructions that, when executed by the one or more computers, cause the one or more computers to perform operations comprising:
receiving a plurality of tokens, the plurality of tokens comprising a first n-gram, and the first n-gram being composed of a first number of atomic units; and
segmenting the plurality of tokens into one or more words based at least in part on a scaled probability of the first n-gram identifying a word, the scaled probability being determined by adjusting an initial probability of the n-gram identifying a word based at least in part on the first number of atomic units.

11. The system of claim 10, wherein the first number of atomic units is n.

12. The system of claim 10, wherein adjusting the initial probability of the first n-gram identifying a word based at least in part on the first number of atomic units comprises:
identifying a scaling weight depending on the first number of atomic units; and
applying the scaling weight to the initial probability of the first n-gram identifying a word to determine the scaled probability of the first n-gram identifying a word.

13. The system of claim 12, wherein the scaled probability of the first n-gram identifying a word is $x^n$, where x is the initial probability of the first n-gram identifying a word and n is the first number of atomic units.

14. The system of claim 12, wherein the scaled probability of the first n-gram identifying a word is $x^{1+k(n-1)}$, where x is the initial probability of the first n-gram identifying a word, n is the first number of atomic units, k is a constant, and $0 \leq k \leq 1$.

15. The system of claim 12, the operations further comprising:
identifying lesser order n-grams, the lesser order n-grams being derived from the first n-gram;
receiving initial probabilities corresponding to each of the lesser order n-grams identifying words;
comparing the initial probability of the first n-gram identifying a word to initial probabilities of combinations of the lesser order n-grams identifying words; and
when an initial probability of a combination of lesser order n-grams identifying a word differs from the initial probability of the first n-gram identifying a word by a specified threshold amount, modifying the scaling weight that depends on the first number of atomic units.

16. The system of claim 10, the operations further comprising:
identifying lesser order n-grams, the lesser order n-grams being derived from the first n-gram; and
identifying a respective scaled probability of each of the lesser order n-grams identifying a word, the scaled probability for a particular lesser order n-gram composed of a particular number of atomic units identifying a word being determined by adjusting an initial probability of the lesser order n-gram identifying a word based at least in part on the particular number of atomic units.

17. The system of claim 16, wherein segmenting the plurality of tokens into one or more words comprises:
when a product of the respective scaled probabilities of the lesser order n-grams derived from the first n-gram identifying a word exceeds the scaled probability of the first n-gram identifying a word, segmenting the first n-gram such that each of the lesser order n-grams identifies a respective word.

18. The system of claim 16, wherein segmenting the plurality of tokens into one or more words comprises:
when the scaled probability of the first n-gram identifying a word exceeds a product of the respective scaled probabilities of the lesser order n-grams derived from the first n-gram identifying a word, segmenting the first n-gram such that the first n-gram identifies a word.

19. A computer program product, tangibly stored on a non-transitory computer-readable medium, comprising instructions operable to cause a programmable processor to:
receiving a plurality of tokens, the plurality of tokens comprising a first n-gram, and the first n-gram being composed of a first number of atomic units; and
segmenting the plurality of tokens into one or more words based at least in part on a scaled probability of the first n-gram identifying a word, the scaled probability being determined by adjusting an initial probability of the n-gram identifying a word based at least in part on the first number of atomic units.

20. The computer program product of claim 19, wherein the first number of atomic units is n.

21. The computer program product of claim 19, wherein adjusting the initial probability of the first n-gram identifying a word based at least in part on the first number of atomic units comprises:
identifying a scaling weight depending on the first number of atomic units; and
applying the scaling weight to the initial probability of the first n-gram identifying a word to determine the scaled probability of the first n-gram identifying a word.

22. The computer program product of claim 21, wherein the scaled probability of the first n-gram identifying a word is $x^n$, where x is the initial probability of the first n-gram identifying a word and n is the first number of atomic units.

23. The computer program product of claim 21, wherein the scaled probability of the first n-gram identifying a word is $x^{1+k(n-1)}$, where x is the initial probability of the first n-gram identifying a word, n is the first number of atomic units, k is a constant, and $0 \leq k \leq 1$.

24. The computer program product of claim 21, the operations further comprising:
   identifying lesser order n-grams, the lesser order n-grams being derived from the first n-gram;
   receiving initial probabilities corresponding to each of the lesser order n-grams identifying words;
   comparing the initial probability of the first n-gram identifying a word to initial probabilities of combinations of the lesser order n-grams identifying words; and
   when an initial probability of a combination of lesser order n-grams identifying a word differs from the initial probability of the first n-gram identifying a word by a specified threshold amount, modifying the scaling weight that depends on the first number of atomic units.

25. The computer program product of claim 19, the operations further comprising:
   identifying lesser order n-grams, the lesser order n-grams being derived from the first n-gram; and
   identifying a respective scaled probability of each of the lesser order n-grams identifying a word, the scaled probability for a particular lesser order n-gram composed of a particular number of atomic units identifying a word being determined by adjusting an initial probability of the lesser order n-gram identifying a word based at least in part on the particular number of atomic units.

26. The computer program product of claim 25, wherein segmenting the plurality of tokens into one or more words comprises:
   when a product of the respective scaled probabilities of the lesser order n-grams derived from the first n-gram identifying a word exceeds the scaled probability of the first n-gram identifying a word, segmenting the first n-gram such that each of the lesser order n-grams identifies a respective word.

27. The computer program product of claim 25, wherein segmenting the plurality of tokens into one or more words comprises:
   when the scaled probability of the first n-gram identifying a word exceeds a product of the respective scaled probabilities of the lesser order n-grams derived from the first n-gram identifying a word, segmenting the first n-gram such that the first n-gram identifies a word.

* * * * *